United States Patent
Kragt et al.

(10) Patent No.: US 12,228,758 B2
(45) Date of Patent: Feb. 18, 2025

(54) LIQUID CRYSTAL MULTILAYER FILM AND PREPARATION METHOD THEREOF

(71) Applicants: SHENZHEN GUOHUA OPTOELECTRONICS CO., LTD., Guangdong (CN); CLIMAD TECHNOLOGY B.V., Nijmegen (NL)

(72) Inventors: Augustinus Jozef Johannes Kragt, Nijmegen (NL); Xiaowen Hu, Guangdong (CN); Guofu Zhou, Guangdong (CN)

(73) Assignees: SHENZHEN GUOHUA OPTOELECTRONICS CO., LTD., Shenzhen (CN); CLIMAD TECHNOLOGY B.V., Nijmegen (NL)

( * ) Notice: Subject to any disclaimer, the term of this patent is extended or adjusted under 35 U.S.C. 154(b) by 112 days.

(21) Appl. No.: 17/765,896

(22) PCT Filed: Oct. 30, 2020

(86) PCT No.: PCT/CN2020/125372
§ 371 (c)(1),
(2) Date: Apr. 1, 2022

(87) PCT Pub. No.: WO2022/011882
PCT Pub. Date: Jan. 20, 2022

(65) Prior Publication Data
US 2022/0381959 A1    Dec. 1, 2022

(30) Foreign Application Priority Data
Jul. 15, 2020 (CN) .......................... 202010680066.5

(51) Int. Cl.
*G02B 5/20* (2006.01)
*C09K 19/38* (2006.01)
(Continued)

(52) U.S. Cl.
CPC .......... *G02B 5/208* (2013.01); *C09K 19/3861* (2013.01); *C09K 19/588* (2013.01); *G02B 1/02* (2013.01)

(58) Field of Classification Search
CPC ...................................................... G02B 5/208
See application file for complete search history.

(56) References Cited

U.S. PATENT DOCUMENTS

2011/0181820 A1    7/2011  Watanabe
2015/0185383 A1    7/2015  Katoh et al.
(Continued)

FOREIGN PATENT DOCUMENTS

| CN | 101291804 A | 10/2008 |
| CN | 102141643 A | 8/2011 |

(Continued)

OTHER PUBLICATIONS

International Search Report from PCT/CN2020/125372, Apr. 16, 2021 (10 pages).
(Continued)

*Primary Examiner* — Edmond C Lau
(74) *Attorney, Agent, or Firm* — Ware, Fressola, Maguire & Barber LLP

(57) ABSTRACT

A multilayer film and a preparation method thereof is provided, and belongs to the technical field of optical films. The provided multilayer film comprises an ultraviolet blocking material and a cholesteric liquid crystal layer. The cholesteric liquid crystal layer comprises a polymerizable liquid crystal monomer, a polymerizable chiral dopant and a photoinitiator. The multilayer film can filter ultraviolet rays and near infrared rays in natural light, thereby reducing the heat effect of the natural light and harms of the ultraviolet rays to people and objects. In addition, the multilayer film
(Continued)

has a high visible light transmission rate, which does not distort the color of the natural light passing through.

3 Claims, 5 Drawing Sheets

(51) Int. Cl.
    *C09K 19/58*    (2006.01)
    *G02B 1/02*    (2006.01)

(56) References Cited

U.S. PATENT DOCUMENTS

| | | | |
|---|---|---|---|
| 2017/0162600 A1* | 6/2017 | Zeng | H10K 59/00 |
| 2018/0136379 A1 | 5/2018 | Takishita et al. | |
| 2021/0171830 A1* | 6/2021 | Verbunt | C09K 19/3402 |
| 2021/0294099 A1* | 9/2021 | Anzai | G02B 5/3016 |
| 2023/0140492 A1* | 5/2023 | Niiyama | G02B 1/14 |
| | | | 359/485.01 |

FOREIGN PATENT DOCUMENTS

| | | |
|---|---|---|
| CN | 102804003 A | 11/2012 |
| CN | 104620144 A | 5/2015 |
| CN | 104662453 A | 5/2015 |
| CN | 107346084 A | 11/2017 |
| CN | 108803182 A | 11/2018 |
| CN | 111812904 A | 10/2020 |
| EP | 2442161 A1 | 4/2012 |
| EP | 2899574 A1 | 7/2015 |
| WO | 2007050433 A1 | 5/2007 |
| WO | 2017018004 A | 2/2017 |

OTHER PUBLICATIONS

Office Action from Chinese Application No. 202010680066.5, Feb. 22, 2021 (18 pages).
Office Action from Chinese Application No. 202010680066.5, Jun. 17, 2021 (19 pages).
Written Opinion from PCT/CN2020/125372, Apr. 16, 2021 (6 pages).
Search Report from Chinese Application No. 202010680066.5, Feb. 22, 2021 (5 pages).
Supplemental Search Report and Search Opinion, European Application No. 20945439.6, Completed Aug. 31, 2022 (5 pages).

\* cited by examiner

LIQUID CRYSTAL MULTILAYER FILM AND PREPARATION METHOD THEREOF

CROSS-REFERENCE TO RELATED APPLICATIONS

The present application is a national phase entry under 35 USC § 371 of International Application PCT/CN2020/125372, filed Oct. 30, 2020, which claims the benefit of and priority to Chinese Patent Application No. 2020106800665, filed Jul. 15, 2020, the entire disclosures of which are incorporated herein by reference.

TECHNICAL FIELD

The present disclosure relates to, but is not limited to, the technical field of optical films, and particularly relates to a liquid crystal multilayer film and a preparation method thereof.

BACKGROUND

Windows are important components of modern architectures, such as vehicles and buildings and can allow natural light to enter indoor spaces, thereby providing a comfortable, healthy and safe environment for occupants. However, natural light entering through a window may also cause danger and discomfort. Sunlight consists of ultraviolet rays (300-400 nm), visible light (400-700 nm) and near infrared rays (700-2,500 nm). The ultraviolet rays interact with materials, such as furniture in buildings, causing discoloration and degradation, and interact with human skin, potentially and negatively affecting human health. Therefore, it is desirable that the window can blocks the ultraviolet rays. Visible light transmission can greatly affect comfort and appearance of a building. The interaction of the window material with the visible light of the solar spectrum determines the coloring of the window. The near infrared sunlight accounts for 52% of solar energy and plays a major role in heating the indoor spaces, which may cause thermal discomfort to the occupants and increase energy consumption for artificial refrigeration. In order to protect indoor materials and the occupants from harms caused by the ultraviolet rays, a laminated glass in which an ultraviolet ray absorbing interlayer (such as polyvinyl butyral) is sandwiched is commonly used.

Another important property of the window is its thermal insulation ability, which is mainly determined by the interaction of the window material with the near infrared sunlight. Thus, metal-containing infrared absorbing dyes are widely used in the window material. These dyes reduce a solar transmission but also substantially absorb the visible light, thus coloring the window glass. In addition, the dyes may heat up and dissipate internal heat. A thin metal matrix which can reflect near infrared sunlight can also be coated on a top part of the glass, commonly known as a low-radiation coating. A layer thickness (<40 nm) should be precisely controlled to obtain uniform and high visible light transmission, which can be obtained a vapor deposition technology.

Near infrared light can also be reflected using a photonic structure. In the photonic structure, materials with different refractive indices (n) are periodically structured because they can reflect light of a particular wavelength at a material interface. The simplest photonic structure is a multi-layered structure, in which two materials with different refractive indices alternate, which is called a distributed Bragg reflector. FIG. 1 is a schematic structural diagram of the Bragg reflector. A selective reflection band can be set into near infrared rays by precisely controlling thickness and the refractive indices variation of each layer.

As an alternative to the photonic structure, the cholesteric liquid crystal (CLC) can be used as a near infrared reflective material. Liquid crystal is a material that has properties between three-dimensionally ordered solids and isotropic liquids. The liquid crystal has a long-distance order in one or two dimensions and thus has anisotropy. For example, the liquid crystal is birefringent, which means that a refractive index ($n_e$) parallel to a long molecular axis is different from the refractive index ($n_o$) perpendicular to the molecular axis. By adding the chiral dopant to the liquid crystal material, molecular directors of the continuous liquid crystal plane rotate relative to each other in a periodic spiral manner. FIG. 2 is a schematic diagram of a CLC periodic helical structure.

SUMMARY

The present disclosure provides a liquid crystal multilayer film and a preparation method thereof. The liquid crystal multilayer film can filter ultraviolet rays and near infrared rays in natural light, thereby reducing a heat effect of the natural light and harms of the ultraviolet rays to people and objects. In addition, the liquid crystal multilayer film has a high visible light transmission, which does not distort the color of the natural light passing through.

In a first aspect, the present disclosure provides a liquid crystal multilayer film comprising a first ultraviolet blocking material and a first cholesteric liquid crystal layer, wherein the first cholesteric liquid crystal layer is coated on the first ultraviolet blocking material.

Specifically, the first cholesteric liquid crystal layer may be prepared from a liquid crystal mixture comprising a polymerizable liquid crystal monomer, a polymerizable chiral dopant and a photoinitiator.

Specifically, the polymerizable chiral dopant may be a levorotatory chiral dopant, and the liquid crystal mixture may comprise the polymerizable liquid crystal monomer, 1.2-6.5 wt % of the levorotatory chiral dopant and 0.5-5 wt % of the photoinitiator. Alternatively, the polymerizable chiral dopant may be a dextrorotatory chiral dopant, and the liquid crystal mixture may comprise the polymerizable liquid crystal monomer, 2.6-18.8 wt % of the dextrorotatory chiral dopant and 0.5-5 wt % of the photoinitiator.

Specifically, the liquid crystal multilayer film may further comprise at least a second cholesteric liquid crystal layer which is coated on the first cholesteric liquid crystal layer.

Specifically, the liquid crystal multilayer film may further comprise a second ultraviolet blocking material which is coated on the other side of the multilayer film relative to the first ultraviolet blocking material.

Specifically, the first cholesteric liquid crystal layer and the second cholesteric liquid crystal layer may have different chirality.

Specifically, the cholesteric liquid crystal layers may further comprise an organic solvent in which a surfactant is dissolved in.

In a second aspect, the present disclosure provides a preparation method of a liquid crystal multilayer film, comprising:

coating the liquid crystal mixture on the first ultraviolet blocking material; and conducting a heating and ultraviolet radiation treatment to enable the liquid crystal mixture to form the first cholesteric liquid crystal layer.

Specifically, the cholesteric liquid crystal may be dissolved in the organic solvent; and the organic solvent may comprise at least one of the following materials: cyclopentanone, methyl ethyl ketone, cyclohexanone and toluene.

Specifically, the heating and ultraviolet radiation treatment may comprise: heating the cholesteric liquid crystal at 100° C. to 120° C. for at least 30 seconds.

Specifically, the heating and ultraviolet radiation treatment may further comprise: irradiating the cholesteric liquid crystal by using long-wave ultraviolet rays at a light intensity of at least $50mJ/cm^2$.

In a third aspect, the present disclosure provides use of the liquid crystal multilayer film according to the first aspect or the liquid crystal multilayer film prepared by the preparation method according to the second aspect in the field of light filtering.

The liquid crystal multilayer film comprises the ultraviolet blocking material and the cholesteric liquid crystal. The polymerizable liquid crystal monomer can be modulated into a levorotatory cholesteric liquid crystal or a dextrorotatory cholesteric liquid crystal by using a polymerizable chiral dopant. According to characteristics of the cholesteric liquid crystals in reflecting near infrared rays with specific wavelengths, the liquid crystal multilayer film reflects the near infrared rays and ultraviolet rays, reduces a heat effect of natural light to protect people and objects and does not distort color of the natural light passing through.

Other features and advantages of the present disclosure will be described in the following specification, and some of these will become apparent from the specification or be understood by implementing the present disclosure. The objectives and other advantages of the present disclosure can be implemented or obtained by structures specifically indicated in the specification, claims, and accompanying drawings.

BRIEF DESCRIPTION OF DRAWINGS

The accompanying drawings are provided for further understanding of the present disclosure, constitute a part of the specification, are intended to explain the technical solutions of the present disclosure with the examples of the present disclosure, but do not intend to limit the technical solutions of the present disclosure.

DETAILED DESCRIPTION

Figure 1:
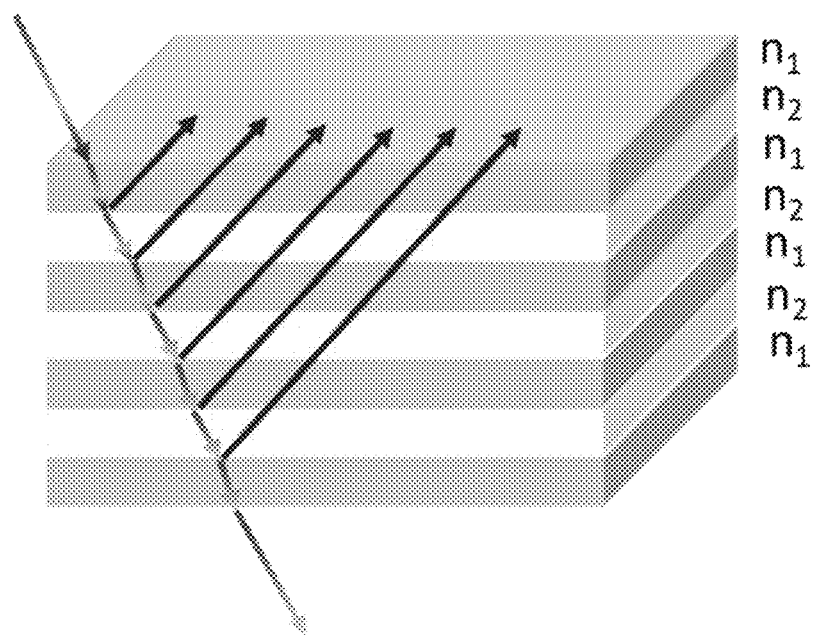
FIG. 1 is a schematic structural diagram of a Bragg reflector.
Figure 2:
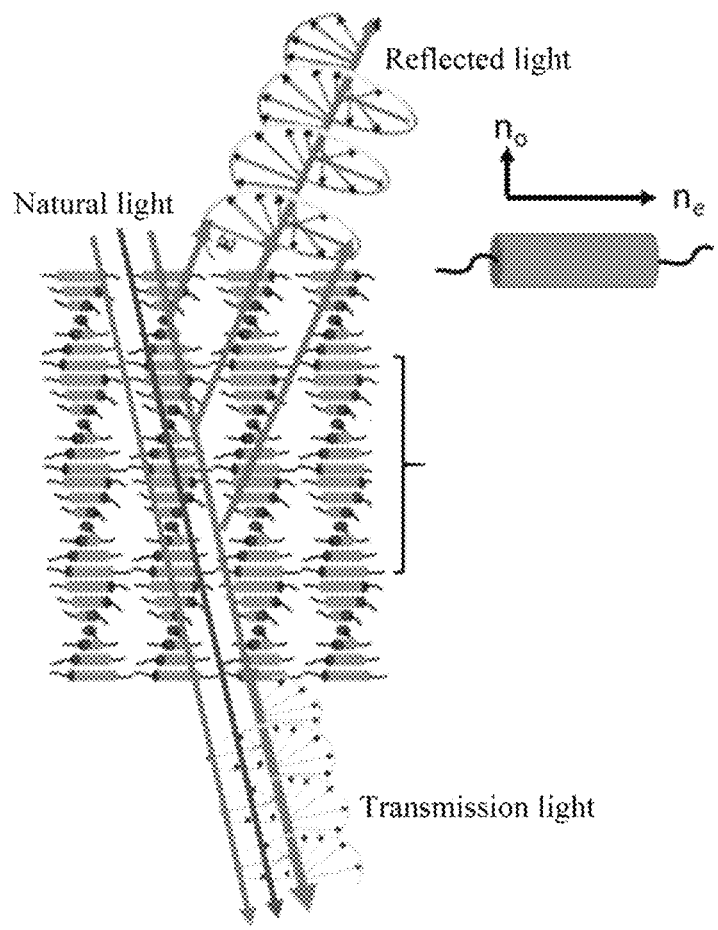
FIG. 2 is a schematic diagram of a CLC periodic helical structure.

As used herein, the term "and/or" includes any and all combinations of one or more related items listed. The terms used herein are only used to describe the specific examples, but are not intended to limit the present disclosure. As used herein, the singular forms "a", "an", and "the" are intended to include plural forms, unless the context clearly indicates. For further understanding, the terms "comprises" "comprising," "includes" and/or "including" used herein, specify the stated features, integers, steps, operations, elements, components, and/or combinations thereof, but do not preclude the presence of one or more additional features, integers, steps, operations, elements, components, and/or combinations thereof.

Unless otherwise specified, all terms used herein (including technical and scientific terms) have the same meanings as those generally understood by those of ordinary skill in the art to which the present disclosure pertains. It will be further understood that the terms, such as those defined in commonly used dictionaries, are interpreted in accordance with their meanings in the context of the relevant field, and are not idealized or overly formal meanings unless clearly defined as such herein.

The exemplary disclosure described herein may appropriately lack any one or more element limitations, which is not specifically disclosed herein. Therefore, the terms "comprises", "comprising", "includes", "including", "contains", "containing" and the like should be understood broadly and non-limitingly. In addition, the term expressions used herein are used for description without limitation, the use of the term expressions that do not include any equivalent characteristics is unintentional, the term expressions only describes some of their characteristics. But according to the rights, various modifications within the scope of the present disclosure are possible. Therefore, although the present disclosure has been specifically disclosed through the preferred examples and optional features, the modifications disclosed herein to embody changes of the present disclosure may be recorded by those skilled in the art, and such modifications and changes will be considered as within the scope of the present disclosure.

The present disclosure has been described broadly and generally here. Smaller species and subgeneric groupings falling within the generic disclosure also form a part of the present disclosure. This includes the removal of any subject matter within the scope of the appended claims, regardless of whether a reduced material is specifically recited herein.

Other examples are included in the following claims and non-limiting examples. In addition, the technical features or related contents of the present disclosure are subject to description of the terms of the Markush group. Those skilled in the art will recognize that the present disclosure is also described by any independent explicit terms or subgroup terms of the Markush group. The concepts, specific content and technical effects of the present disclosure are clearly and completely described below in conjunction with examples, so as to allow the objectives, features and effects of the present disclosure to be fully understood. Apparently, the described examples are merely some rather than all of the examples of the present disclosure. All other examples obtained by those skilled in the art based on the examples of the present disclosure without creative efforts should fall within the protection scope of the present disclosure. The raw materials used in the following examples are all commercially available, unless otherwise specified. The preparation methods in the examples are all conventional methods, unless otherwise specified.

Figure 3:
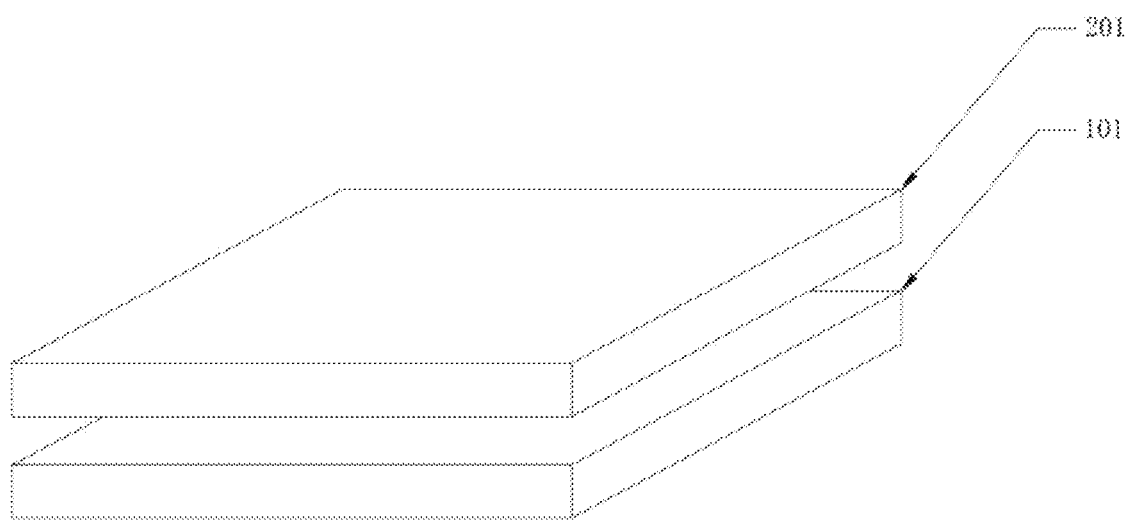
FIG. 3 is a schematic diagram of a liquid crystal multilayer film provided by an example of the present disclosure.

FIG. 3 is a liquid crystal multilayer film provided by an example of the present disclosure. As shown in FIG. 3, the multilayer film at least includes a first cholesteric liquid crystal layer 201 and a first ultraviolet blocking material 101. The first cholesteric liquid crystal layer 201 is coated on the first ultraviolet blocking material 101. The first cholesteric liquid crystal layer 201 has a thickness between 3 μm to 10 μm. The first cholesteric liquid crystal layer 201 includes a polymerizable liquid crystal monomer, a levorotatory polymerizable chiral dopant and a photoinitiator. The levorotatory polymerizable chiral dopant accounts for 1.2-6.5 wt % of the first cholesteric liquid crystal layer 201. The photoinitiator accounts for 0.5-5 wt % of the first cholesteric liquid crystal layer 201. The multilayer film can filter ultraviolet rays and near infrared rays in natural light, thereby reducing the influences of the ultraviolet rays on people and objects indoors, and reducing the heat effect caused by near infrared rays.

In an example, the first cholesteric liquid crystal layer 201 includes dextrorotatory or levorotatory cholesteric liquid crystal. The polymerizable chiral dopant is a levorotatory chiral dopant, and the liquid crystal mixture includes a polymerizable liquid crystal monomer, 1.2-6.5 wt % of the levorotatory chiral dopant and 0.5-5 wt % of a photoinitiator. Alternatively, the polymerizable chiral dopant is a dextrorotatory chiral dopant, and the liquid crystal mixture includes a polymerizable liquid crystal monomer, 2.6-18.8 wt % of the dextrorotatory chiral dopant and 0.5-5 wt % of a photoinitiator. The cholesteric liquid crystals have a multi-layer structure, molecular directions in the same layer are the same and molecular directions of adjacent layers are deflected, thus a dextrorotatory polarized light can be reflected. Due to a selective polarization reflection of the cholesteric liquid crystal, the adjusted dextrorotatory cholesteric liquid crystal can reflect near infrared rays in natural light according to the Bragg effect. Since the near infrared rays contain more than half of the energy of the natural light, reflecting near infrared rays can reduce the heat effect of the natural light passing through the multilayer film.

In an example, the arrangement of the cholesteric liquid crystals includes a chiral nematic phase. The polymerizable chiral dopant is added during preparation of the cholesteric liquid crystals, thus the cholesteric liquid crystal has a selective reflection function, and a reflecting effect on specific wavelengths of light is realized.

Figure 4:
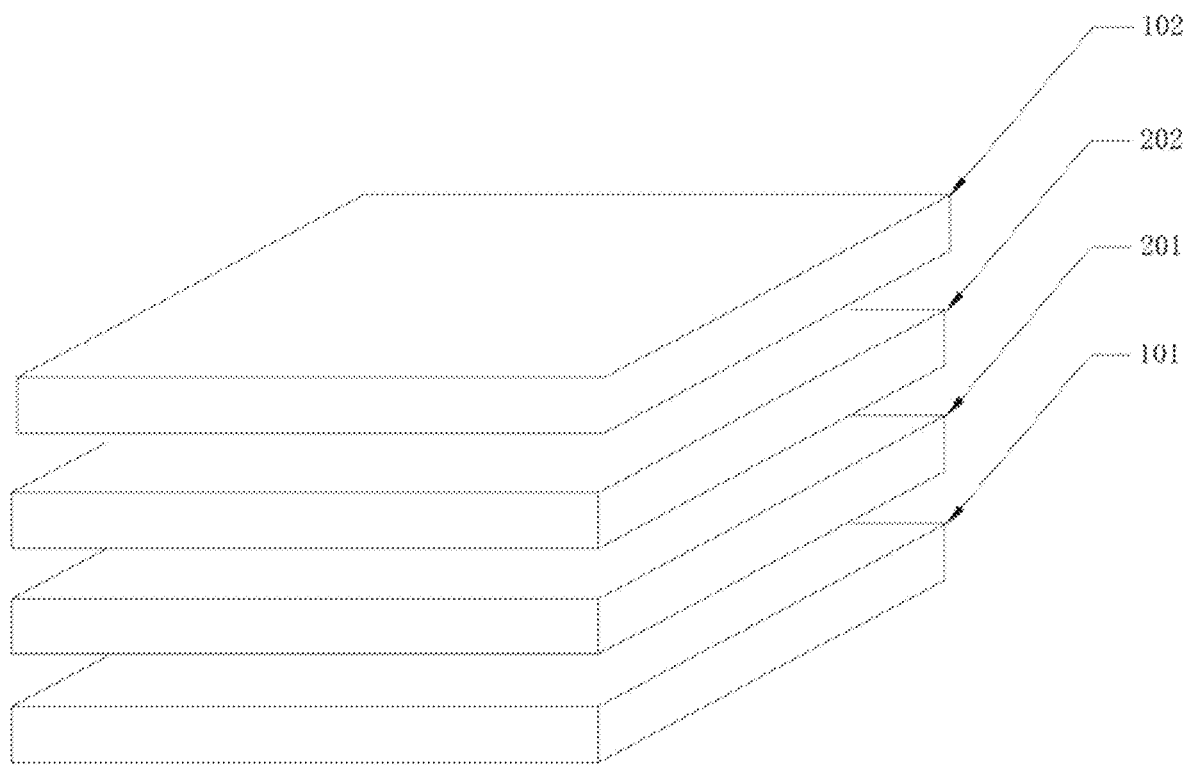
FIG. 4 is a schematic structural diagram of a liquid crystal multilayer film provided by another example of the present disclosure.

FIG. 4 is a multilayer film provided by another example of the present disclosure. As shown in FIG. 4, the multilayer film at least includes a first cholesteric liquid crystal layer 201, a second cholesteric liquid crystal layer 202, a first ultraviolet blocking material 101 and a second ultraviolet blocking material 102. The second cholesteric liquid crystal layer 202 is coated on the first cholesteric liquid crystal layer 201, and the second ultraviolet blocking material 102 is coated on the second cholesteric liquid crystal layer 202. The second cholesteric liquid crystal layer 202 has a thickness between 3 μm and 10 μm. The second cholesteric liquid crystal layer 202 includes a polymerizable liquid crystal monomer, a dextrorotatory polymerizable chiral dopant and a photoinitiator. The dextrorotatory polymerizable chiral dopant accounts for 2.6-18.8% of the second cholesteric liquid crystal layer 202, and the photoinitiator accounts for 0.5-5 wt % of the second cholesteric liquid crystal layer 202.

The polymerizable liquid crystal monomer, the dextrorotatory polymerizable chiral dopant and the photoinitiator accounts for a total weight of 100 wt %. The multilayer film can filter ultraviolet rays and near infrared rays in natural light, thereby reducing the influences of the ultraviolet rays on people and objects indoors, and reducing the heat effect caused by near infrared rays.

In an example, the first cholesteric liquid crystal layer 201 and the second cholesteric liquid crystal layer 202 may have opposite chirality. The levorotatory cholesteric liquid crystals have a multi-layer structure, molecular directions in the same layer are the same and molecular directions of adjacent layers are deflected, thus a levorotatory polarized light can be reflected. The levorotatory cholesteric liquid crystal is combined with the dextrorotatory cholesteric liquid crystal to reflect the levorotatory polarized light and the dextrorotatory polarized light. Since near infrared rays in natural light comprise the levorotatory polarized light and the dextrorotatory polarized light, reflecting the levorotatory polarized light and the dextrorotatory polarized light can reduce the transmission rate of the near infrared rays.

Figure 5:
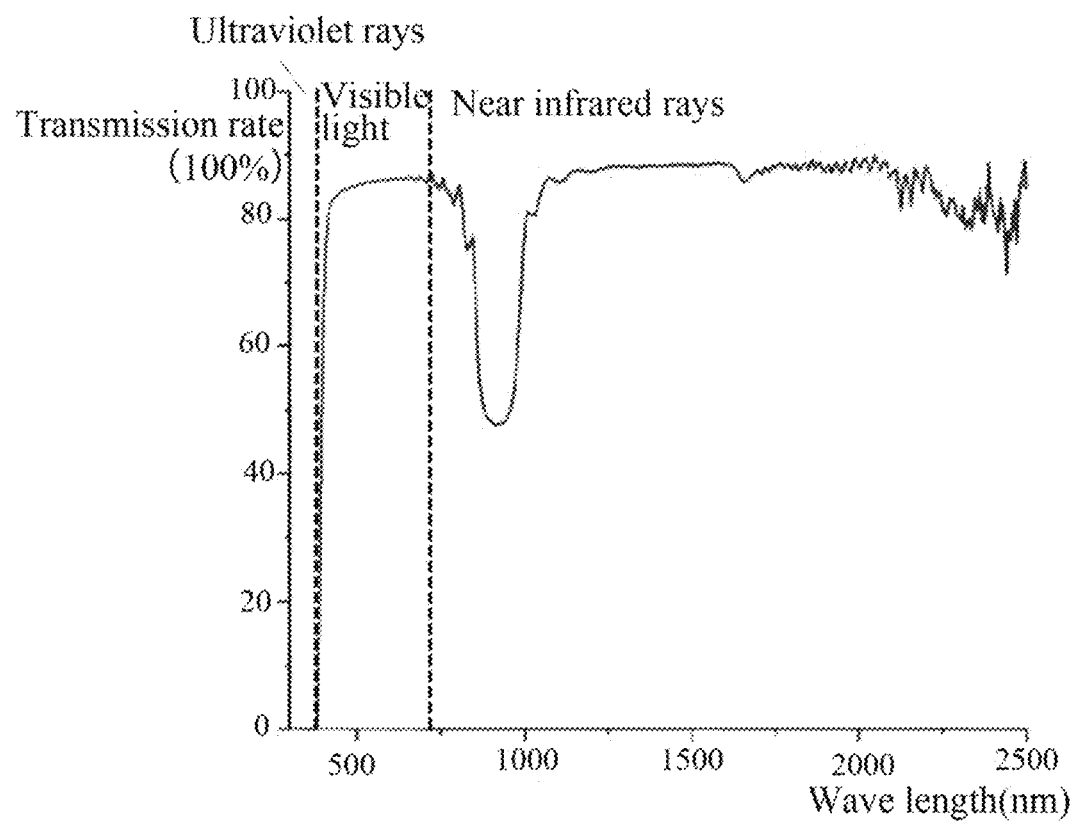
FIG. 5 is a diagram showing a light transmission rate of a liquid crystal multilayer film provided by an example of the present disclosure.

FIG. 5 is a diagram showing a light transmission rate of a liquid multilayer film provided by an example of the present disclosure. As shown in FIG. 5, the levorotatory polymerizable chiral dopant accounts for 3.2 wt % of the first cholesteric liquid crystal layer 201, the photoinitiator accounts for 5 wt % of the first cholesteric liquid crystal layer 201, and the polymerizable liquid crystal monomer accounts for 86.8 wt % of the first cholesteric liquid crystal layer 201. The mixture to prepare the first cholesteric liquid crystal layer 201 further includes 5 wt % of an organic solvent cyclopentanone, in which 1 wt % of a surfactant BYK-361N is dissolved. The liquid crystal mixture is dissolved in the organic solvent cyclopentanone at a ratio of 1:1, and the liquid crystal mixture with a thickness of 10 μm is coated on the first ultraviolet blocking material 101 polyethylene terephthalate (PET) at a speed of 1.3 cm/s, heated at 110° C. for 1 min, and irradiated by using ultraviolet rays at a light intensity of 88 mJ/cm$^2$ to obtain a multilayer film. The multilayer film can reduce the transmission rate of ultraviolet rays to 0.2% and the transmission rate of near infrared rays with the wavelength around 916 nm and the bandwidth of 135 nm to 48%, and at the same time maintain the transmission rate of visible light at 86% and the total transmission rate of natural light at 80%. The multilayer film can reduce the transmission rates of the ultraviolet rays and the near infrared rays in natural light, and reduce harms brought by the ultraviolet rays and the heat effect brought by the near infrared rays. At the same time, the high transmission rate of the visible light can ensure that the natural light passing through the multilayer film has a low distortion rate. When the multilayer film is used for ultraviolet and near-infrared protection, the low distortion rate of the natural light can still be ensured when observing at 45 degrees from the side surface of the multilayer film.

Figure 6:
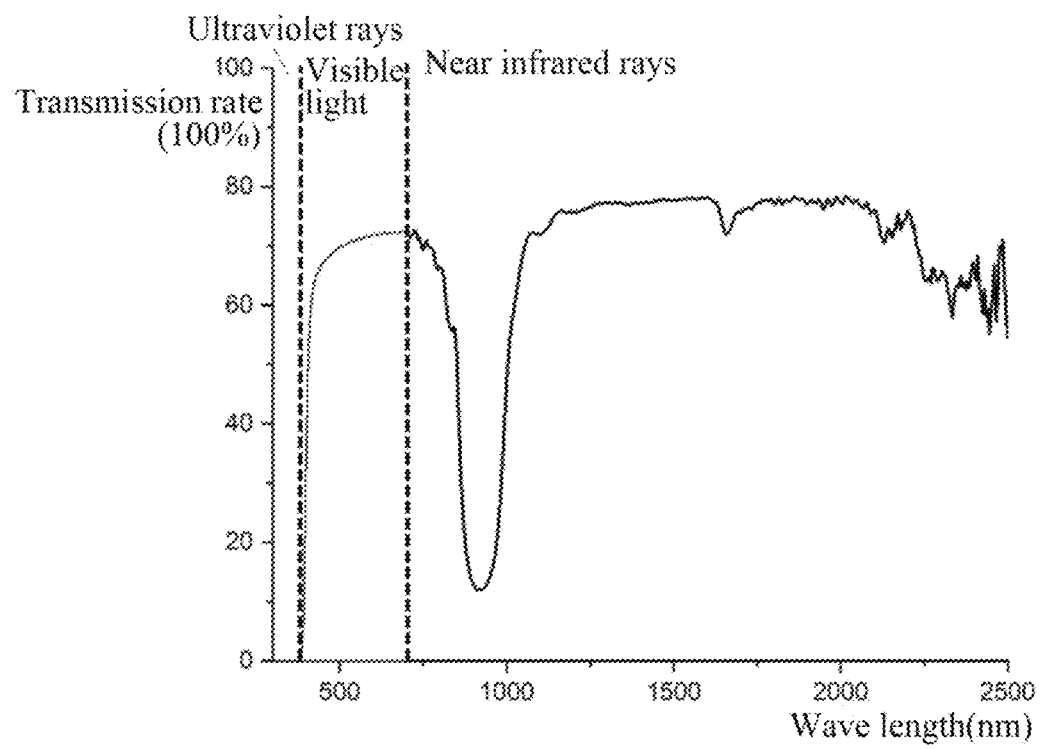
FIG. 6 is a diagram showing a light transmission rate of a liquid crystal multilayer film provided by another example of the present disclosure.

FIG. 6 is a diagram showing a transmission rate of a liquid crystal multilayer film provided by an example of the present disclosure. As shown in FIG. 6, the multilayer film includes a first ultraviolet blocking material 101, a first cholesteric liquid crystal layer 201, a second cholesteric liquid crystal layer 202 and a second ultraviolet blocking material. The first cholesteric liquid crystal layer 201 has the same components as the first cholesteric liquid crystal 201 in FIG. 5. The dextrorotatory polymerizable chiral dopant accounts for 7.2 wt % of the second cholesteric liquid crystal layer 202, the photoinitiator accounts for 5 wt % of the second cholesteric liquid crystal layer 202, and the polymerizable liquid crystal monomer accounts for 82.8 wt % of the second cholesteric liquid crystal layer 202. The mixture to prepare the second cholesteric liquid crystal layer 202 includes 5 wt % of an organic solvent cyclopentanone, in which 1 wt % of a surfactant BYK-361N is dissolved. The liquid crystal mixture is dissolved in the organic solvent cyclopentanone at a ratio of 1:1, and the liquid crystal mixture with a thickness of 10 μm is coated on the first ultraviolet blocking material 101 polyethylene terephthalate (PET) at a speed of 1.3 cm/s, heated at 110° C. for 1 min, and irradiated by using ultraviolet rays at a light intensity of 88 mJ/cm² to obtain a multilayer film. The multilayer film can reduce the transmission rate of ultraviolet rays to be least than 0.005% and the transmission rate of near infrared rays with the wavelength around 928 nm and the bandwidth of 145 nm to 12%, and at the same time maintain the transmission rate of visible light at 71% and the total transmission rate of natural light at 63%. When used to filter natural light, the multilayer film can reduce the heat effect brought by the near infrared rays.

Figure 7:
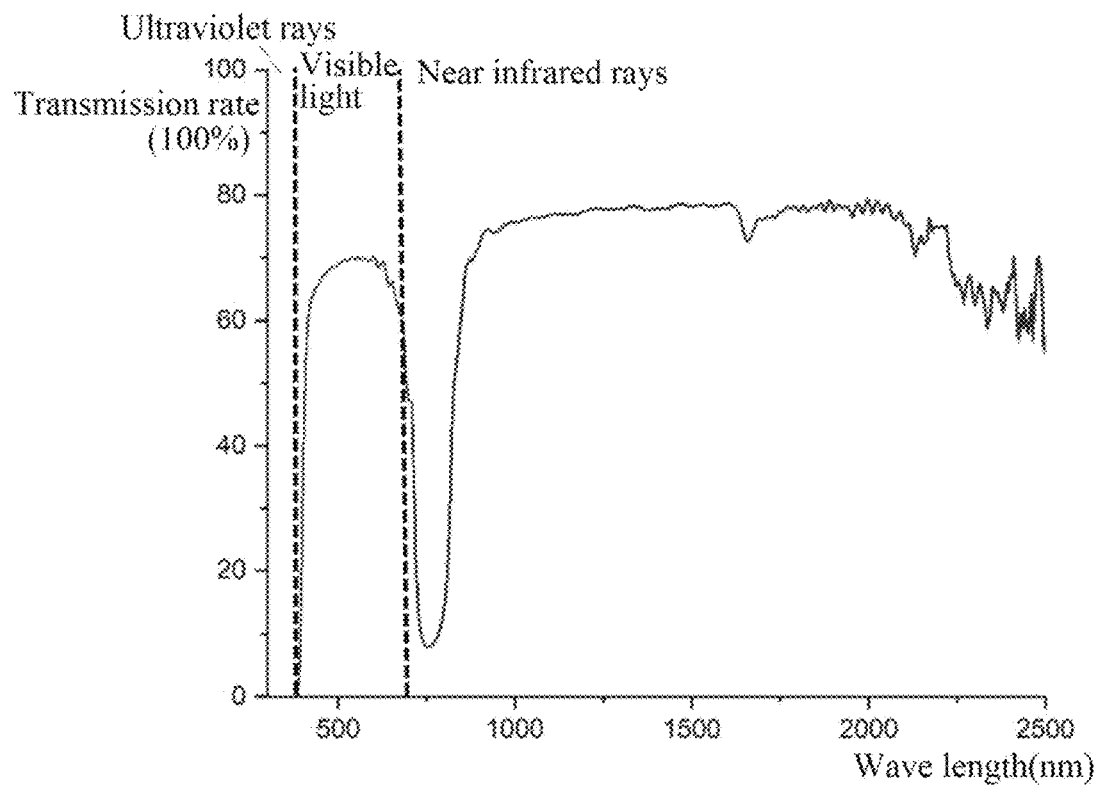
FIG. 7 is a diagram showing a light transmission rate of a liquid crystal multilayer film provided by another example of the present disclosure.

FIG. 7 is a diagram showing a transmission rate of a liquid crystal multilayer film provided by an example of the present disclosure. As shown in FIG. 7, in the multilayer film, the levorotatory polymerizable chiral dopant accounts for 3.8 wt % of the first cholesteric liquid crystal layer 201, the photoinitiator accounts for 5 wt % of the first cholesteric liquid crystal layer 201, and the polymerizable liquid crystal monomer accounts for 86.2 wt % of the first cholesteric liquid crystal layer 201. The mixture to prepare the first cholesteric liquid crystal layer 201 further includes 5 wt % of an organic solvent cyclopentanone, in which 1 wt % of a surfactant BYK-361N is dissolved. In the second cholesteric liquid crystal layer 202, the dextrorotatory polymerizable chiral dopant accounts for 3.8 wt % of the second cholesteric liquid crystal layer 202, the photoinitiator accounts for 5 wt % of the second cholesteric liquid crystal layer 202, and the polymerizable liquid crystal monomer accounts for 82.2 wt % of the second cholesteric liquid crystal layer 202. The mixture to prepare the second cholesteric liquid crystal layer 202 further includes 5 wt % of the organic solvent cyclopentanone, in which 1 wt % of the surfactant BYK-361N is dissolved. The liquid crystal mixture is dissolved in the organic solvent cyclopentanone at a ratio of 1:1, and the liquid crystal mixture with a thickness of 10 μm is coated on the first ultraviolet blocking material 101 polyethylene terephthalate (PET) at a speed of 1.3 cm/s, heated at 110° C. for 1 min, and irradiated by using ultraviolet rays at a light intensity of 88 mJ/cm² to obtain a multilayer film. The multilayer film can reduce the transmission rate of ultraviolet rays to be less than 0.005% and the transmission rate of near infrared rays with the wavelength of 769 nm and the bandwidth of 105 nm to 8%, and at the same time maintain the transmission rate of visible light at 69% and the total transmission rate of natural light at 61%. When used to filter natural light, the multilayer film can reduce influences of the ultraviolet rays and near infrared rays on people and objects.

Figure 8:
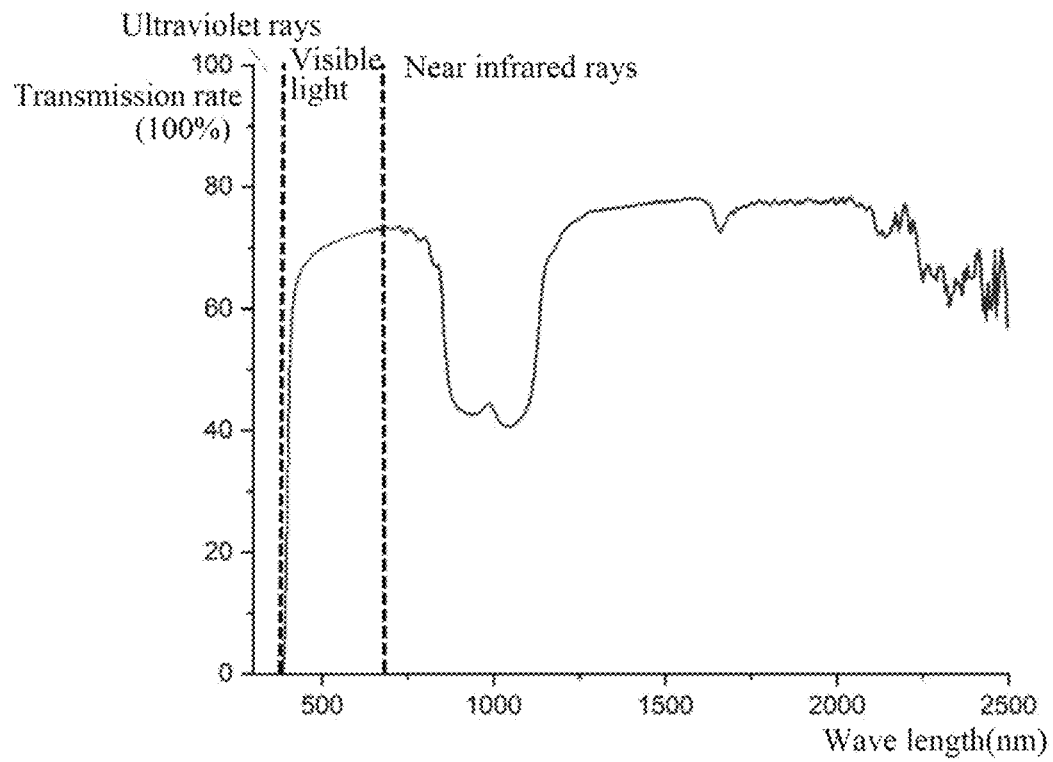
FIG. 8 is a diagram showing a light transmission rate of a liquid crystal multilayer film provided by another example of the present disclosure.

FIG. 8 is a diagram showing a transmission rate of a multilayer film provided by an example of the present disclosure. As shown in FIG. 8, in the multilayer film, the first cholesteric liquid crystal layer 201 is the same as the first cholesteric liquid crystal layer 201 in FIG. 5. In the second cholesteric liquid crystal layer 202, the polymerizable chiral dopant accounts for 2.8 wt % of the second cholesteric liquid crystal layer 202, the photoinitiator Irgacure 369 accounts for 5 wt % of the second cholesteric liquid crystal layer 202, and the polymerizable liquid crystal monomer accounts for 87.2 wt % of the second cholesteric liquid crystal layer 202. The mixture to prepare the second layer further includes 5 wt % of an organic solvent, in which 1 wt % of a surfactant is dissolved in the organic solvent. The liquid crystal mixture is dissolved in the organic solvent cyclopentanone at a ratio of 1:1, and the liquid crystal mixture with a thickness of 10 μm is coated on the first ultraviolet blocking material 101 polyethylene terephthalate (PET) at a speed of 1.3 cm/s, heated at 110° C. for 1 min, and irradiated by using ultraviolet rays at a light intensity of 88 mJ/cm² to obtain a multilayer film. The multilayer film can reduce the transmission rate of ultraviolet rays to be less than 0.005% and the transmission rate of near infrared rays with the wavelength of 988 nm and the bandwidth of 280 nm to 42%, and at the same time maintain the transmission rate of visible light at 71% and the total transmission rate of natural light at 65%. When used to filter natural light, the multilayer film can reduce influences of the ultraviolet rays and near infrared rays on people and objects.

In an example, when the photoinitiator accounts for 5 wt % of the cholesteric liquid crystal layers, the coating process of the cholesteric liquid crystal layers can be conducted in an air environment. The coating in the air environment can reduce the cost of preparing the multilayer film.

In an example, when the photoinitiator accounts for 0.5 wt % of the cholesteric liquid crystal layers, the coating process of the cholesteric liquid crystal layers needs to be conducted in one or more of nitrogen, helium, neon, argon, krypton, and xenon environments. The coating process in the specific gas environment can improve purity of the cholesteric liquid crystal layers, and reduce the amount of the photoinitiator.

In an example, the surfactant is polyacrylate-based surfactant. The polyacrylate-based surfactant includes at least one selected from the group consisting of Byk-361N, Byk-378, Byk-UV 3510 and Byk-Dynwet 800N. The surfactant can improve wettability of the cholesteric liquid crystal solution.

In an example, the matrix material includes at least one selected from the group consisting of glass, polyethylene terephthalate, biaxially oriented polypropylene, and polycarbonate. The matrix can filter ultraviolet rays with the wavelength of 10 nm-400 nm, and reduce the transmission rate of the ultraviolet rays. The ultraviolet rays can cause harms to people and objects.

In an example, the polymerizable liquid crystal monomer material includes 2-(methoxycarbonyl)-1,4-phenylene-bis (6-((((4-(acryloyloxyoxy)ethoxy)carbonyl)oxy)-2-naphthoic acid).

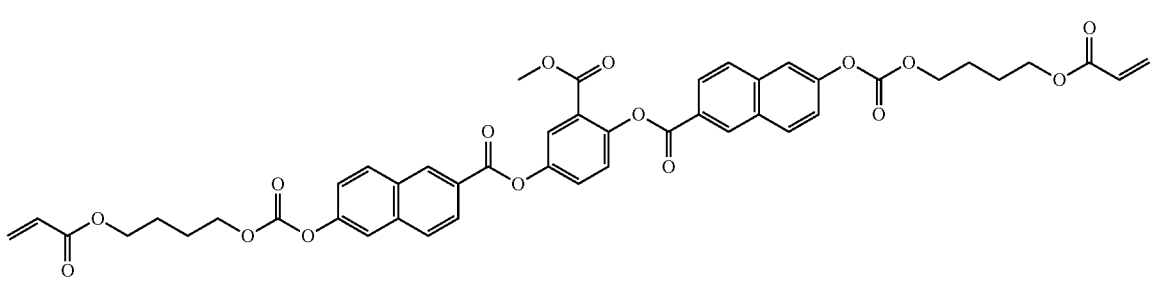

In one example, the levorotatory polymerizable chiral dopant is used to modulate the cholesteric liquid crystal into the dextrorotatory cholesteric liquid crystal.

In an example, the levorotatory polymerizable chiral dopant includes (3R, 3aR, 6S, 6aR)-hexahydro furan [3,2-b] furan-3,6-diyl bis(4-(((4-(acryloyloxy)butoxy)carbonyl)oxy)benzoyl)oxy)benzoate).

In an example, the cholesteric liquid crystal is coated on the ultraviolet blocking material, specifically, the cholesteric liquid crystal with a thickness of 3 μm-10 μm is coated on the ultraviolet blocking material at a speed of 1 cm/s to 2 cm/s. After the cholesteric liquid crystal is dissolved in the organic solvent, the cholesteric liquid crystal may be coated on the ultraviolet blocking material. When the thickness of

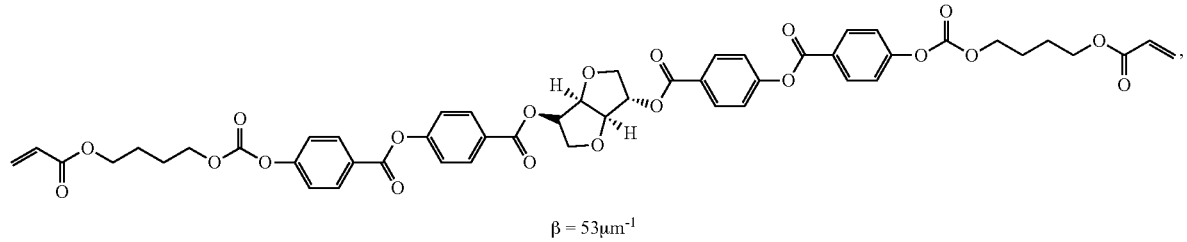

2

$\beta = 53\mu m^{-1}$

In one example, the dextrorotatory polymerizable chiral dopant is used to modulate the cholesteric liquid crystal into the levorotatory cholesteric liquid crystal.

In an example, the dextrorotatory polymerizable chiral dopant includes (((((3R, 3aR, 6S, 6aR)-hexahydro furan [3,2-b]furan-3,6-diyl)bis(oxy)bis(carbonyl)bis(4,1-phenylene)bis(6-((((4-(acryloxyoxy)butoxy)carbonyl)oxy)-2-naphthoic acid).

the cholesteric liquid crystal is 3 μm-10 μm, the levorotatory polarized light or the dextrorotatory polarized light can be reflected.

In an example, the multilayer film is heated at 100° C. to 120° C. for at least 30 seconds. The multilayer film is heated to volatilize the organic solvent and retain the cholesteric liquid crystal on the matrix.

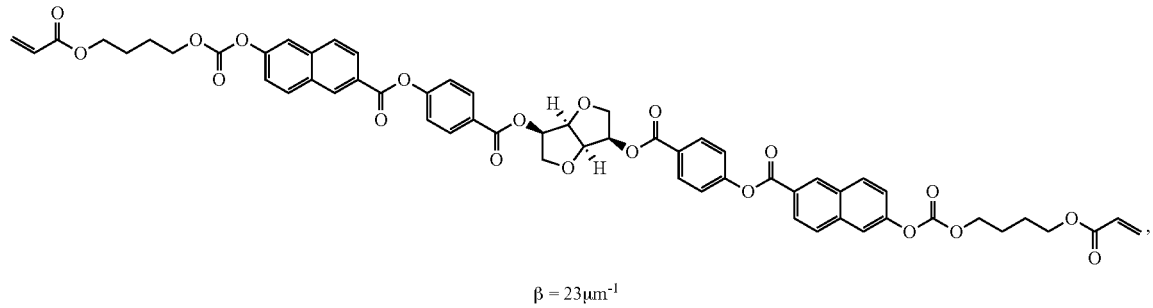

3

$\beta = 23\mu m^{-1}$

Figure 9:
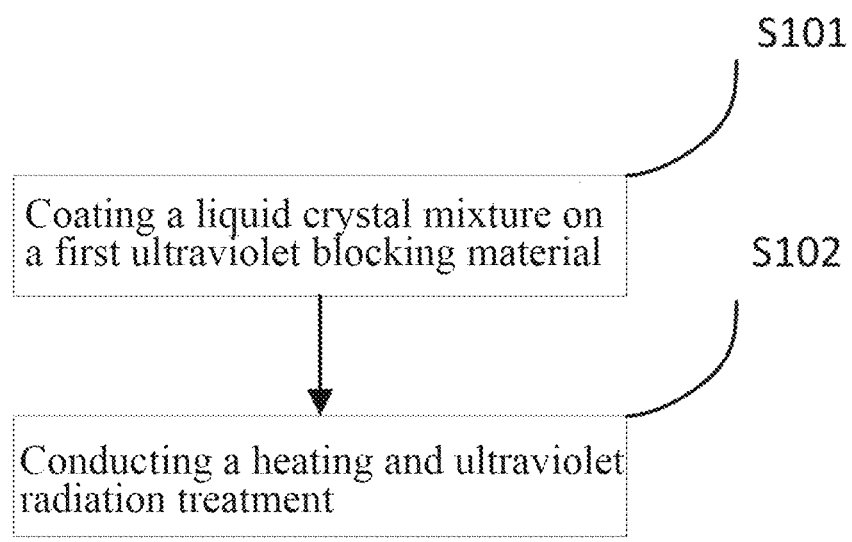
FIG. 9 is a process diagram of a preparation method of a liquid crystal multilayer film provided by an example of the present disclosure.

FIG. 9 is a process diagram of a preparation method of a multilayer film provided by an example of the present disclosure. As shown in FIG. 9, the preparation method includes the following steps:

S101: coating a liquid crystal mixture on a first ultraviolet blocking material; and S102: conducting a heating and ultraviolet radiation treatment.

In an example, the cholesteric liquid crystal is coated on the ultraviolet blocking material, and the multilayer film is heated and irradiated with the ultraviolet rays to cure the cholesteric liquid crystal into a cholesteric liquid crystal layer. Levorotatory or dextrorotatory chirality of the cholesteric liquid crystal layer is maintained.

In an example, the cholesteric liquid crystal is dissolved in an organic solvent. Dissolving the cholesteric liquid crystal in the organic solvent may increase fluidity the cholesteric liquid crystal, such that the cholesteric liquid crystal can be coated on the ultraviolet blocking material.

In an example, the organic solvent includes at least one selected from the group consisting of cyclopentanone, methyl ethyl ketone, cyclohexanone and toluene.

In an example, the multilayer film is irradiated with long-wave ultraviolet rays with a light intensity of at least 50 mJ/cm². Irradiating the multilayer film with the long-wave ultraviolet rays can cure the cholesteric liquid crystal into the cholesteric liquid crystal layer.

The preferred examples of the present disclosure are specifically described, but the present disclosure is not limited to the above embodiments. Those skilled in the art can make various equivalent modifications or substitutions without departing from the spirit of the present disclosure. The equivalent modifications or substitutions are all included in the scope defined by the claims of the present disclosure.

The invention claimed is:

1. A liquid crystal multilayer film, comprising:
   a first ultraviolet blocking material;
   a first cholesteric liquid crystal layer, wherein the first cholesteric liquid crystal layer is coated on the first ultraviolet blocking material,
   wherein the first cholesteric liquid crystal layer is prepared from a liquid crystal mixture comprising a polymerizable liquid crystal monomer, a polymerizable chiral dopant and a photoinitiator, the first cholesteric liquid crystal layer further includes an organic solvent cyclopentanone, a surfactant is dissolved in the organic solvent, the surfactant is polyacrylate-based surfactant, the polymerizable liquid crystal monomer material includes 2-(methoxycarbonyl)-1,4-phenylene-bis (6-((((4-(acryloyloxyoxy) ethoxy) carbonyl) oxy)-2-naphthoic acid); and a second cholesteric liquid crystal layer, wherein at least the second cholesteric liquid crystal layer is coated on the first cholesteric liquid crystal layer, and the first cholesteric liquid crystal layer and the second cholesteric liquid crystal layer have different chirality;

wherein, the polymerizable chiral dopant is a levorotatory chiral dopant, and the liquid crystal mixture comprises the polymerizable liquid crystal monomer, 1.2-6.5 wt % of the levorotatory chiral dopant and 0.5-5 wt % of the photoinitiator; or the polymerizable chiral dopant is a dextrorotatory chiral dopant, and the liquid crystal mixture comprises the polymerizable liquid crystal monomer, 2.6-18.8 wt % of the dextrorotatory chiral dopant and 0.5-5 wt % of the photoinitiator;

wherein, the first ultraviolet blocking material includes at least one selected from the group consisting of glass, polyethylene terephthalate, biaxially oriented polypropylene, and polycarbonate.

2. The liquid crystal multilayer film according to claim 1, further comprising:

a second ultraviolet blocking material which is overlaying the other side of the multilayer film relative to the first ultraviolet blocking material.

3. The liquid crystal multilayer film according to claim 1, wherein the second cholesteric liquid crystal layer is prepared from a mixture further comprising:

an organic solvent in which a surfactant is dissolved in.

* * * * *